United States Patent
Zarringhalam et al.

(10) Patent No.: US 11,738,806 B2
(45) Date of Patent: Aug. 29, 2023

(54) SYSTEMS AND METHODS FOR SMOOTHING AUTOMATED LANE CHANGING (ALC) OPERATIONS

(71) Applicant: GM GLOBAL TECHNOLOGY OPERATIONS LLC, Detroit, MI (US)

(72) Inventors: Reza Zarringhalam, Whitby (CA); Mohammadali Shahriari, Markham (CA); Amir Takhmar, Toronto (CA); Paul A. Adam, Milford, MI (US); Namal P. Kumara, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 17/215,524

(22) Filed: Mar. 29, 2021

(65) Prior Publication Data
US 2022/0306199 A1     Sep. 29, 2022

(51) Int. Cl.
*B62D 15/02*     (2006.01)
*B60K 35/00*     (2006.01)

(52) U.S. Cl.
CPC .......... *B62D 15/0255* (2013.01); *B60K 35/00* (2013.01); *B60K 2370/178* (2019.05)

(58) Field of Classification Search
CPC ................ B62D 15/0255; B60K 35/00; B60K 2370/178; B60W 30/18163
See application file for complete search history.

(56) References Cited

U.S. PATENT DOCUMENTS

| | | | |
|---|---|---|---|
| 2019/0071079 A1* | 3/2019 | Nishiguchi | B62D 6/10 |
| 2020/0269839 A1* | 8/2020 | Sato | B60W 50/0097 |
| 2020/0369281 A1* | 11/2020 | Sato | B60W 30/143 |

* cited by examiner

*Primary Examiner* — Geepy Pe
*Assistant Examiner* — Clint Pham
(74) *Attorney, Agent, or Firm* — Lorenz & Kopf LLP

(57) ABSTRACT

Systems and methods for smoothing automated lane change (ALC) operations. A mission planner, upon receipt of an ALC request, sends a ALC heads up signal to a lateral control. The mission planner then begins confidence building operations, for a preprogrammed duration of time, and awaits an ALC ready signal from the lateral control. The lateral control, upon receipt of the ALC heads up, calculates an index of readiness, $R_{ALC}$, as a function of the requested ALC, a current trajectory, and a lane centering control path. When $R_{ALC}$ is less than or equal to a readiness threshold, Rt, the lateral control sends the ALC ready signal. When $R_{ALC}$ is greater than Rt, the lateral control generates a steering correction and applies the steering correction to reduce the $R_{ALC}$ and thereby stabilize the vehicle and send the ALC ready signal. Upon receiving the ALC ready signal, the ALC operation is executed.

20 Claims, 6 Drawing Sheets

SYSTEMS AND METHODS FOR SMOOTHING AUTOMATED LANE CHANGING (ALC) OPERATIONS

TECHNICAL FIELD

The present disclosure generally relates to automated control for operations in mobile platforms, and more particularly relates to systems and methods for smoothing automated lane change (ALC) operations in mobile platforms.

A request for an automated lane change (ALC) can occur in a driverless mobile platform or in a mobile platform having a driver. Depending upon the initial conditions and trajectory of the mobile platform when the ALC request is made, various technical problems can be presented, as the response of the mobile platform may vary. In some scenarios, the ALC may immediately disengage. In other scenarios, driver alerts showing the ALC being engaged/disengaged can flicker and cause a nuisance, and in still other scenarios, execution of an ALC responsive to the ALC request can be uncomfortable for a passenger.

The following disclosure provides a technological solution to these technical problems, in addition to addressing related issues. Furthermore, other desirable features and characteristics of the system and method will become apparent from the subsequent detailed description and the appended claims, taken in conjunction with the accompanying drawings and the preceding background.

SUMMARY

Provided is a system for automated lane change (ALC) operations implemented onboard a vehicle. The system includes: a mission planner module configured to: receive an ALC request; send an ALC heads up signal comprising the requested ALC responsive to the ALC request; perform confidence building operations, for a preprogrammed duration of time, responsive to the ALC request; and upon completion of the confidence building operations, determine whether the ALC is justified based on the results of the confidence building operations; and a lateral control module operationally coupled to the mission planner module and configured to: receive the ALC heads up signal comprising the requested ALC; calculate an index of readiness, $R_{ALC}$, responsive to the ALC heads up signal, the $R_{ALC}$ being a function of the ALC request, a current trajectory, and lane centering controls status; compare $R_{ALC}$ to a predefined readiness threshold, Rt; and when $R_{ALC}$ is less than or equal to Rt, send an ALC ready signal; and when $R_{ALC}$ is greater than Rt, perform stabilization operations; the mission planner module further configured to receive the ALC ready signal, and generate commands to execute the ALC when the ALC is justified, responsive to receiving the ALC ready signal.

In an embodiment, the mission planner module is further configured to: when the ALC is justified, responsive to receiving the ALC ready signal, generate commands to alert a driver of the ALC.

In an embodiment, the mission planner module is further configured to: receive data about nearby road actors from a camera system and sensors; receive mapping data from a mapping system; receive navigation system data for the vehicle; and determine that the ALC is justified upon a determination that an intended lane is still available and all identified road actors are driving consistently.

In an embodiment, the mission planner module is further configured to: receive data about nearby road actors from a camera system and sensors; receive data about a road surface from the camera system and sensors; receive mapping data from a mapping system; receive navigation system data for the vehicle; and determine that the ALC is justified upon a determination that an intended lane is still available, all identified road actors are driving consistently, and the road surface has not changed in a significant way.

In an embodiment, the mission planner module is further configured to: determine that the ALC is not justified upon a determination that an intended lane is no longer available, or a road actor is driving inconsistently; and withdraw the ALC heads up signal.

The system of claim 4, wherein the mission planner module is further configured to: determine that the ALC is not justified upon a determination that an intended lane is no longer available, a road actor is driving inconsistently, or a road surface has changed in a significant way; and withdraw the ALC heads up signal.

In an embodiment, the lateral control module is further configured to: calculate a steering correction, $\delta_{AP}$, required to reduce $R_{ALC}$ prior to launching the ALC, the steering correction being a function of a current trajectory and a speed of the vehicle; and wherein performing stabilization operations includes calculating a steering correction.

In an embodiment, performing stabilization operations further includes applying a steering correction, $\delta_{AP}$ to stabilize the vehicle before an ALC launch.

In an embodiment, applying the steering correction, $\delta_{AP}$ includes applying a series of incremental adjustments, made at respective increments of time.

Also provided is a method for automated lane change (ALC) operations implemented onboard a vehicle. The method includes: at a mission planner module comprising a processor programmed with programming instructions, performing the operations of: receiving an ALC request; sending an ALC heads up signal comprising the requested ALC responsive to the ALC request; performing confidence building operations, for a preprogrammed duration of time, responsive to the ALC request; and determining whether the ALC is justified based on the results of the confidence building operations; at a lateral control module operationally coupled to the mission planner module, performing the operations of: receiving the ALC heads up signal comprising the requested ALC; calculating an index of readiness, $R_{ALC}$, responsive to the ALC heads up signal, the $R_{ALC}$ being a function of the ALC request, a current trajectory, and lane centering controls; comparing $R_{ALC}$ to a predefined readiness threshold, Rt; and when $R_{ALC}$ is less than or equal to Rt, sending an ALC ready signal; and when $R_{ALC}$ is greater than Rt, performing stabilization operations; further comprising, at the mission planner module, receiving the ALC ready signal, and generating commands to execute the ALC when the ALC is justified, responsive to receiving the ALC ready signal.

In an embodiment, at the mission planner module: generating commands to alert a driver of the ALC when the ALC is justified, responsive to receiving the ALC ready signal.

In an embodiment, at the mission planner module: receiving data about nearby road actors from a camera system and sensors; receiving mapping data from a mapping system; receiving navigation system data for the vehicle; and determining that the ALC is justified upon a determination that an intended lane is still available and all identified road actors are driving consistently.

In an embodiment, at the mission planner module: receiving data about nearby road actors from a camera system and sensors; receiving data about a road surface from the camera system and sensors; receiving mapping data from a mapping system; receiving navigation system data for the vehicle; and determining that the ALC is justified upon a determination that an intended lane is still there, all identified road actors are driving consistently, and the road surface has not changed in a significant way.

In an embodiment, at the mission planner module: determining that the ALC is not justified upon a determination that an intended lane is no longer available, or a road actor is driving inconsistently; and withdrawing the ALC heads up signal.

In an embodiment, at the mission planner module: determining that the ALC is not justified upon a determination that an intended lane is no longer available, a road actor is driving inconsistently, or a road surface has changed in a significant way; and withdrawing the ALC heads up signal.

In an embodiment, at the lateral control module: calculating a steering correction, $\delta_{AP}$, required to reduce $R_{ALC}$ prior to launching the ALC, the steering correction being a function of a current trajectory and a speed of the vehicle; and wherein performing stabilization operations includes calculating a steering correction.

In an embodiment, performing stabilization operations further includes applying a steering correction, $\delta_{AP}$ to stabilize the vehicle before an ALC launch.

In an embodiment, wherein applying the steering correction, $\delta_{AP}$ includes applying a series of incremental adjustments, made at respective increments of time.

Also provided is a system for automated lane change (ALC) operations implemented onboard a vehicle. The system including: a central platform controller configured to: receive input from a user interface; receive data about nearby road actors from a camera system and sensors; receive mapping data from a mapping system; receive navigation system data for the vehicle; vet an initial ALC request to thereby generate an ALC request based on the initial ALC request; send an ALC heads up signal comprising the requested ALC responsive to the ALC request; perform confidence building operations, for a preprogrammed duration of time, responsive to the ALC request; and upon completion of the confidence building operations, determine that the ALC is justified upon a determination that an intended lane is still available, all identified road actors are driving consistently, and the road surface has not changed in a significant way; a drive system operationally coupled to the central platform controller and configured to: receive the ALC heads up signal comprising the requested ALC; calculate an index of readiness, $R_{ALC}$, responsive to the ALC heads up signal, the $R_{ALC}$ being a function of the requested ALC, a current trajectory, and lane centering controls; compare $R_{ALC}$ to a predefined readiness threshold, Rt; and when $R_{ALC}$ is less than or equal to Rt, send an ALC ready signal; and when $R_{ALC}$ is greater than Rt, perform stabilization operations; the central platform controller further configured to receive the ALC ready signal, and generate commands to execute the ALC and generate commands to alert a driver of the ALC, when the ALC is justified, responsive to receiving the ALC ready signal.

In an embodiment, the drive system is further configured to calculate a steering correction, $\delta_{AP}$, required to reduce $R_{ALC}$ prior to launching the ALC, the steering correction being a function of a current trajectory and a speed of the vehicle; and perform stabilization operations that include calculating a steering correction.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
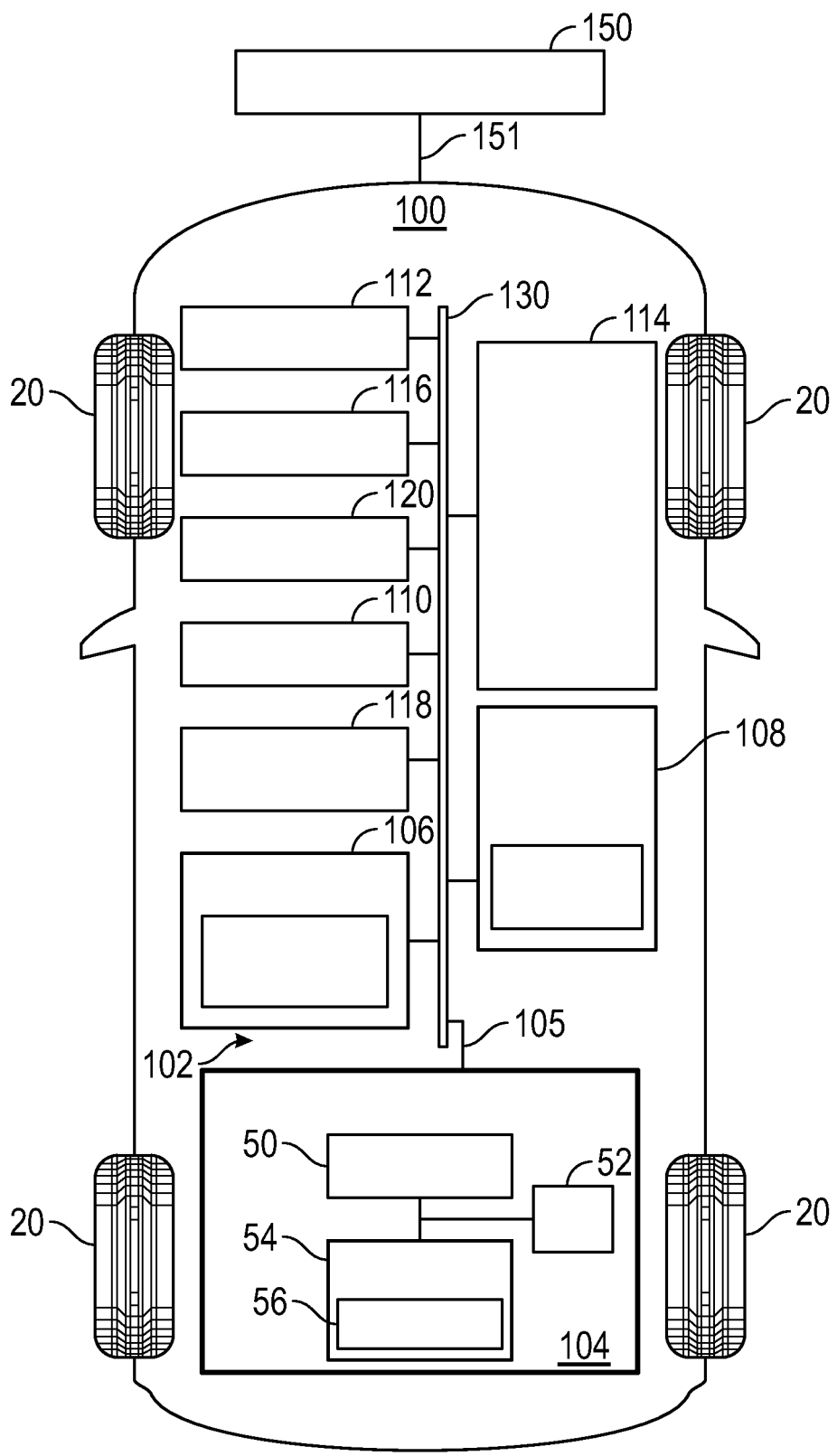
FIG. 1 is a schematic diagram illustrating a system for smoothing automated lane change operations implemented onboard a vehicle, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" may refer to any hardware, software, firmware, electronic control component, processing logic, and/or processor device, individually or in any combination. In various embodiments, a module is one or more of: an application specific integrated circuit (ASIC), a field-programmable gate-array (FPGA), an electronic circuit, a computer system comprising a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, depending upon the initial conditions and trajectory of the mobile platform when the ALC request is made, various technical problems can be presented, as the response of the mobile platform may vary. In some scenarios, the ALC may immediately disengage. In other scenarios, driver alerts showing the ALC being engaged/disengaged can flicker and cause a nuisance, and in still other scenarios, execution of an ALC responsive to the ALC request can be uncomfortable for a passenger.

Exemplary embodiments provide a technological solution to this problem with technologically enhanced systems and methods for smoothing automated lane change operations in mobile platforms. Provided embodiments implement an algorithm that coordinates control and feedback between a mission planner module and a lateral control module. The provided algorithm calculates an index of readiness to perform the ALC and, depending on the magnitude of the index of readiness, performs stabilization prior to executing the ALC.

Applications and mobile platforms that rely on ALC operations may experience improved consistency in driver alerting and improved comfort in ALC operations when using the embodiments described herein. The technologically enhanced systems and methods for smoothing automated lane change operations in mobile platforms are described in more detail in connection with the figures below.

FIG. 1 is a functional block diagram depicting an example mobile platform. The example mobile platform is a vehicle 100 that is capable of movement, towing and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels 20, each of which are rotationally coupled to the chassis near a respective corner of the body. The vehicle 100 is depicted with four wheels 20, but the number of wheels 20 may vary in other embodiments. The vehicle 100 may be autonomous or semi-autonomous. The vehicle 100 includes at least a collective functional block, drive systems 106, which generally includes known vehicle systems for vehicle operation, such as, a propulsion system, a transmission system, a steering system, actuators for the wheels, and a brake system, and generates a variety of signals, including vehicle speed and vehicle acceleration. In various embodiments, the drive systems 106 are operationally coupled to one or more onboard components and systems via a communication bus 130.

External sources 150 includes one or more other mobile platforms (also referred to herein as "road actors") that are external to the vehicle 100, in the environment surrounding the vehicle 100. A system for smoothing automated lane change operations in mobile platforms, shown generally as system 102, includes an ALC smoothing circuit 104. In various embodiments, the ALC smoothing circuit 104 is communicatively coupled to onboard systems and components via the communication bus 130 as illustrated by connection 105. The ALC smoothing circuit 104 may transmit commands and controls for the various onboard systems and components via connection 105 and the communication bus 130. The ALC smoothing circuit 104 may obtain information from and about various road actors via onboard camera system 118 and sensors, and/or via a transceiver 112.

Returning to the vehicle 100, the vehicle 100 may include one or more other components and/or onboard systems that may each communicate with the ALC smoothing circuit 104, generally via the communication bus 130. Non-limiting examples of the onboard components include the drive systems 106, a central platform controller 108, user interface 114, the transceiver 112, a global positioning system (GPS) 116, the camera system 118 and sensors, a mapping system 110, and a navigation system 120. The functions and operations of each of these components are described in more detail below.

In various embodiments, the central platform controller 108 may receive and integrate communications from a variety of modules and systems known to be present in the above described vehicle 100. Accordingly, in some embodiments, the inputs provided by the central platform controller 108 to the ALC smoothing circuit 104 may include or represent user inputs (including ALC requests), mobile applications and systems inputs, inputs from off-board communications (e.g., via the transceiver 112), and inputs that are based on the global positioning system (GPS 116), navigation system 120, mapping system 110, camera system 118 and sensors, and drive systems 106.

The user interface 114 may provide any combination of touch, voice/audio, cursor, button press and gesture control for a passenger in the vehicle 100. Accordingly, the user interface 114 may include a display device and an audio device, as is known in the industry.

The transceiver 112 may be configured to enable communication between onboard components and systems and various external sources 150, such as cloud server systems. Accordingly, in various embodiments, the transceiver 112 includes the hardware and software to support one or more communication protocols for wireless communication 151 (e.g., WiFi and Bluetooth) between the ALC smoothing circuit 104 and external sources, such as routers, internet, the cloud, satellites, communication towers and ground stations.

GPS 116 is a global positioning system as is known in the mobile platform industry. GPS 116 may interact via the transceiver 112 and various external sources to provide information about a location in three-dimensional space of the vehicle at any given time.

Mapping system 110 includes a database for storing up to date and high-resolution maps of streets, environmental features, and the like.

Navigation system 120 may obtain and process signals from various onboard components to make determinations about current location, trajectory, speed, acceleration, etc., as well as coordinate with the central platform controller 108, GPS 116, and mapping system 110 to plan a future location, trajectory, speed, acceleration, turns, and the like.

The camera system 118 and sensors include one or more cameras and sensors for detecting location and movement of road actors and features surrounding the vehicle. The camera system 118 may include one or more optical cameras (e.g., forward facing, 360-degree, rear-facing, side-facing, stereo, etc.), thermal (e.g., infrared) cameras, and the like, mounted on the vehicle, and capable of zooming in and zooming out. The camera system 118 may include or be part of a front collision module (FCM), augmented reality camera (ARC), or the like. In operation, the camera in the camera system 118 and sensors senses light levels, luminance, edges, contrast, saturation of light, etc., and converts the sensed information into data which is may place on the communication bus 130. In an embodiment, the camera system 118 includes object recognition software. The sensors in the camera system 118 and sensors may be configured to transmit, receive, and process lidar, radar, or other signals to make determinations about location and movement of nearby road actors.

In various embodiments, as shown in FIG. 1, the ALC smoothing circuit 104 is realized as an enhanced computer system, comprising computer readable storage device or media, memory 54, for storage of instructions, algorithms, and/or programs, such as vehicle-target localization algorithm and a plurality of preprogrammed thresholds and parameters, the processor 50 to execute the program 56, and input/output interface (I/O) 52. The computer readable storage device or media, memory 54, may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The memory 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle 100. In various embodiments, processor 50 is configured to implement the system 102. The memory 54 may also be utilized by the processor 50 to cache data, to temporarily store results of comparisons and analyses, and the like. Information in the memory 54 may be organized and/or imported from an external source during an initialization or installment operation in a method; it may also be programmed via a user I/O interface.

The input/output interface (I/O) 52 may be operationally coupled to the processor 50 via a bus and enables intra-circuit 104 communication as well as extra-circuit 104 communication. The input/output interface (I/O) 52 may include one or more wired and/or wireless network interfaces and can be implemented using any suitable method and apparatus. In various embodiments, the input/output interface (I/O) 52 includes the hardware and software to support one or more communication protocols for wireless communication between the processor 50 and external sources, such as satellites, the cloud, communication towers and ground stations. In various embodiments, the input/output interface (I/O) 52 supports communication with technicians, and/or one or more storage interfaces for direct connection to storage apparatuses.

During operation of the system 102, the processor 50 loads and executes one or more algorithms, instructions, and rules embodied as program 56, and, as such, controls the general operation of the system 102. During operation of the system 102, the processor 50 may receive data from the communication bus 130 or external sources (such as WiFi signal(s) 142 and communications 107). In various embodiments of the system 102, the ALC smoothing circuit 104 may: perform operations attributed to the system 102 in accordance with an algorithm; perform operations in accordance with state machine logic; and, perform operations in accordance with logic in a programmable logic array.

While the exemplary embodiment of the system 102 is described in the context of the ALC smoothing circuit 104 implemented as a fully functioning enhanced computer system, those skilled in the art will recognize that the mechanisms of the present disclosure are capable of being distributed as a program product including program 56 and predefined parameters. Such a program product may comprise an arrangement of instructions organized as multiple interdependent program code modules, each configured to achieve a separate process and/or perform a separate algorithmic operation, arranged to manage data flow through the system 102. The program code modules may each comprise an ordered listing of executable instructions for implementing logical functions for the processes performed by the system 102. The instructions in the program code modules, when executed by a processor (e.g. processor 50), cause the processor to receive and process signals, and perform logic, calculations, methods and/or algorithms as described herein for automatically and in real-time performing vehicle-target localization and generating associated commands.

Once developed, the program code modules constituting a program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Figure 2:
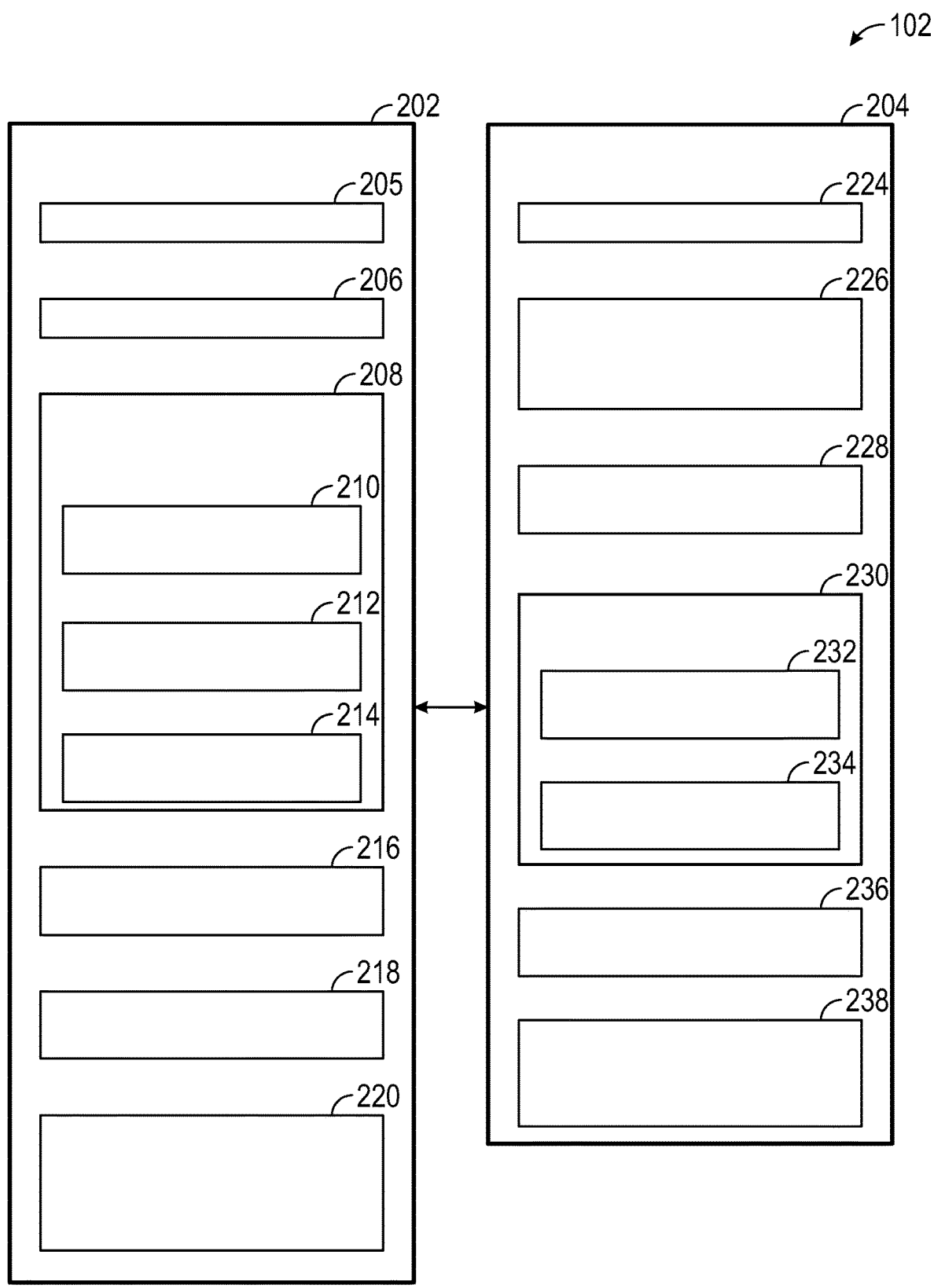
FIG. 2. is an architectural block diagram of one or more application modules that may be operating in the system for smoothing automated lane change operations.
Figure 3:
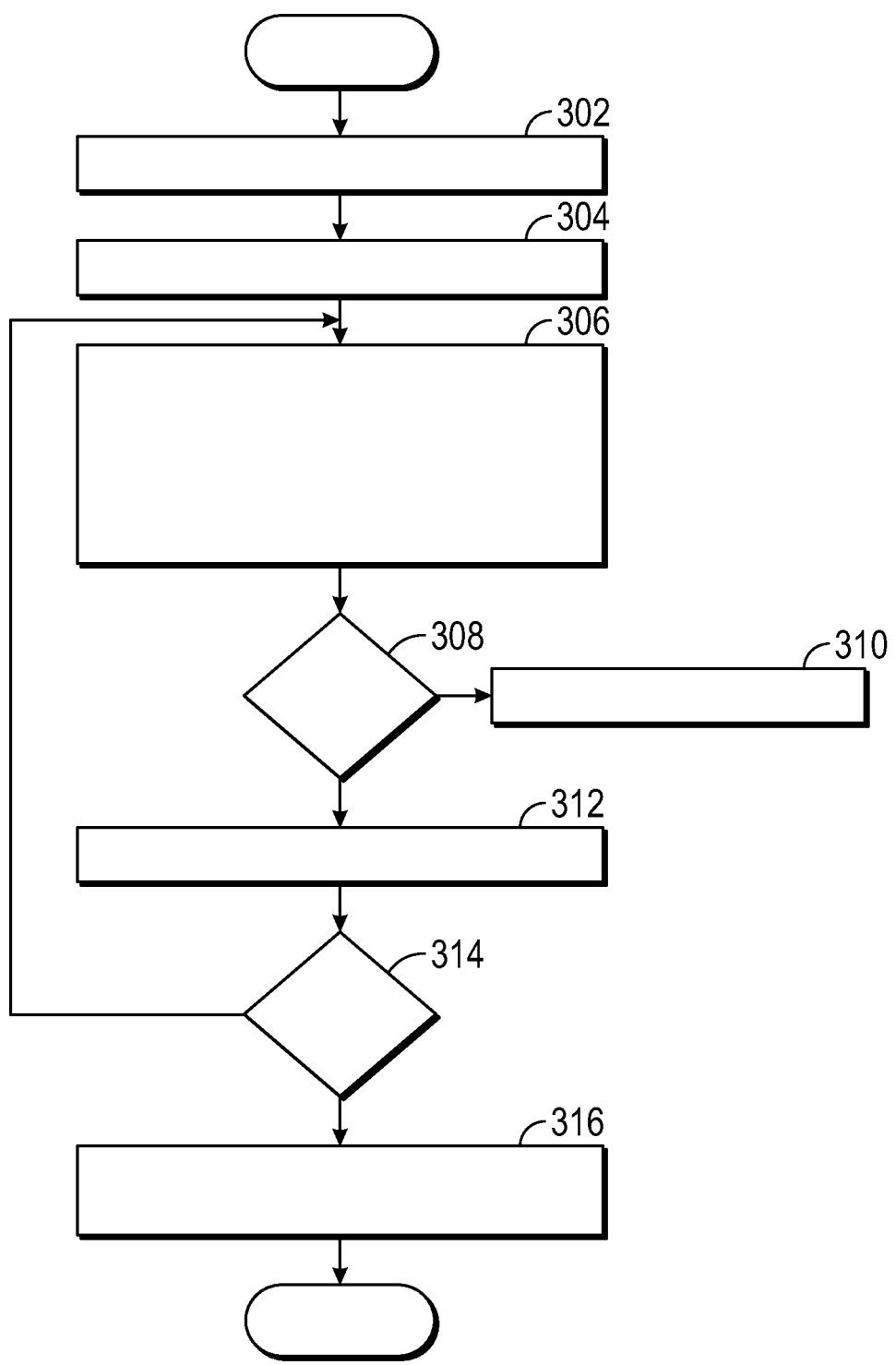
FIGS. 3-4 provide a process flow chart depicting an example method for smoothing automated lane change operations in a mobile platform, in accordance with various embodiments.
Figure 4:
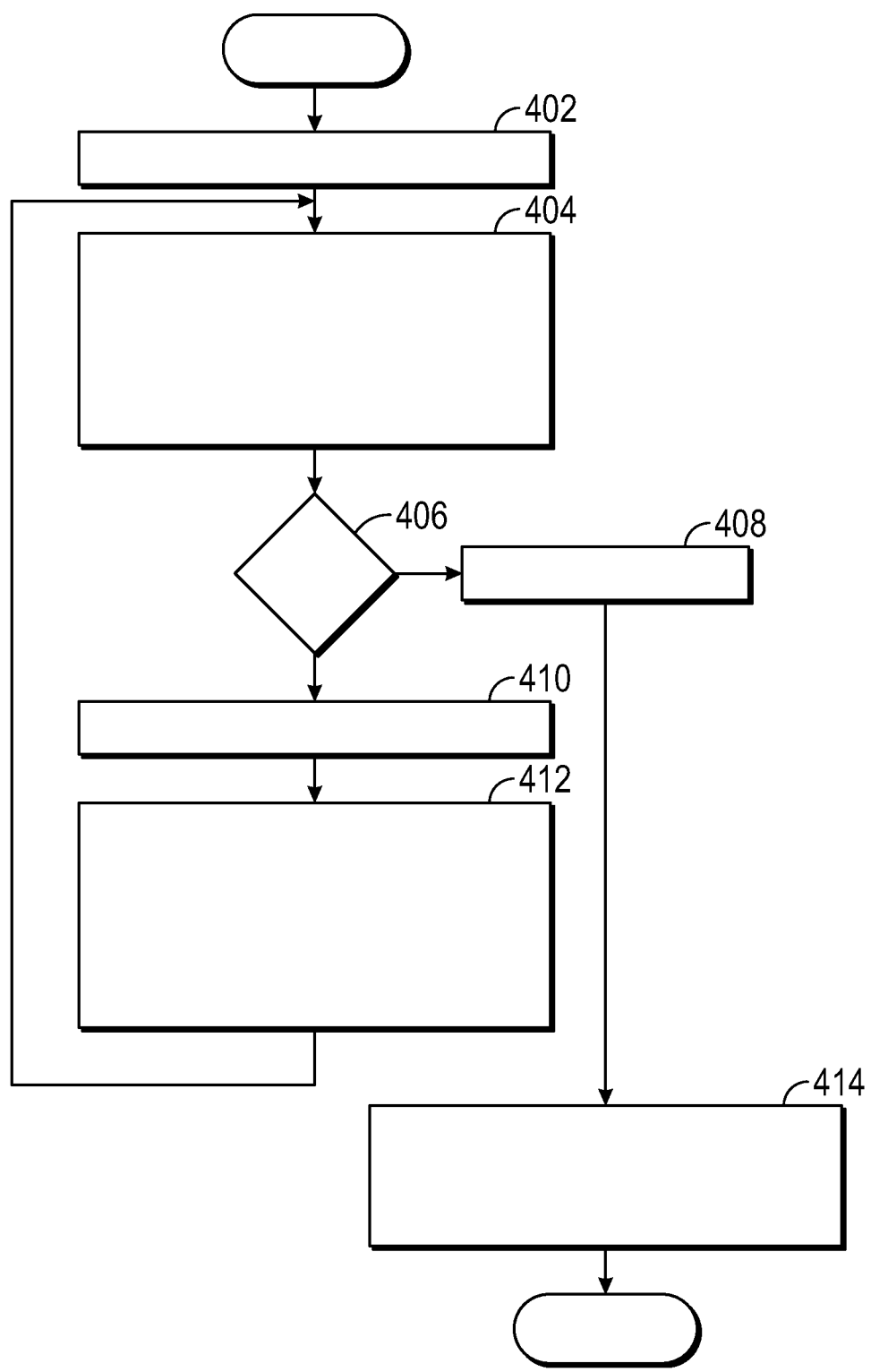

Turning now to FIGS. 2-4, and with continued reference to FIG. 1, various method steps and associated exemplary application process modules of the system for smoothing automated lane change operations 102 (also shortened herein to "system" 102) are described. FIG. 2 is an architectural block diagram of one or more application modules that may be operating in the system 102, and is used in conjunction with FIGS. 3-4, illustrating steps of a method for smoothing automated lane change operations, shown generally as method 300.

In the example of FIG. 2, the system 102 is generally divided between operations performed by a Mission Planner Module 202 and operations performed by the lateral control module 204, with shared communications 207, described in more detail below. In various embodiments, the Mission Planner Module 202 is part of the central platform controller 108 and the lateral control module 204 is part of the drive systems 106. In an application, each module may be realized as one or more sub-modules, and the modules and sub-modules may be distributed among and between various onboard systems and components. In various embodiments, the operations performed by the Mission Planner Module 202 and the operations performed by the lateral control module 204, may embody program code enhancements to one or more different components of the vehicle 100, as illustrated in FIG. 1.

For illustrative purposes, the following description of method 300 may refer to elements mentioned above in connection with FIGS. 1-2. In various embodiments, portions of method 300 may be performed by different components of the described system 102. It should be appreciated that method 300 may include any number of additional or alternative operations and tasks, the tasks shown in FIGS. 3-4 need not be performed in the illustrated order, and method 300 may be incorporated into a more comprehensive procedure or method, such as a ride-sharing application, having additional functionality not described in detail herein. Moreover, one or more of the tasks shown in FIGS. 3-4 could be omitted from an embodiment of the method 300 if the intended overall functionality remains intact.

In various embodiments, it is understood that the receiving ALC request module 205 receives an ALC request (at 302) that represents what may be obtained from available systems as an initial ALC request and then vetted to generate the ALC request of the present embodiments. Specifically, the ALC request (at 302) implies that the central platform controller 108 has first obtained an initial ALC request, e.g., via the user interface 114, or another processing module within the central platform controller 108 and vetted it. Said differently, the central platform controller 108 has already obtained an initial ALC request and acquired information about relevant road actors and made an initial assessment of the conditions (e.g., road geometry, surface conditions, and road actors, as compared to the vehicle 100 current trajectory) necessary to generate a specific lane change (as may be shown for example, in FIG. 5 path 506). The operations performed after 302 describe the technological enhancements provided by the system 102, which begin with receiving the ALC request that has been vetted from the initial ALC request. Responsive to receiving the ALC request, the mission planner module 202 (for example, via the sending ALC heads-up module 206) sends an ALC heads up signal comprising the requested ALC (at 304) to the lateral control module 204.

The mission planner module 202 performs confidence building operations at 306 for a preprogrammed duration of time, responsive to the ALC request (e.g., in an ALC confidence building module 208). Confidence building operations at 306 include, for a preprogrammed duration of time, using the navigation system data for the vehicle 100, and comparing other available data. Confidence building operations at 306 include, for example, observing lanes and road geometry; wherein the observing may mean receiving and processing data from the camera system 118 and sensors, and mapping data from the mapping system 110, for the preprogrammed duration of time to identify whether there has been a change, and if there has been a change, whether it exceeds a tolerance threshold; and, based on the results of the observing, determining whether an intended lane (of the ALC) is still present, or has ended. In various embodiments, these operations are performed by a lane and geometry observation module 210.

In various embodiments, confidence building operations at 306 may include, for the preprogrammed duration of time, observing one or more already identified road actors to determine, for each road actor of the one or more road actors, if it is moving consistently or erratically. In various embodiments, these operations may be performed by a road actor observation module 212. As before, observing may mean receiving and processing data about one or more road actors from the camera system 118 and sensors, and mapping data from the mapping system 110, for the preprogrammed duration of time, and comparing results to a movement threshold. Based on the observing and the movement threshold, the system 102 may determine that a road actor is moving consistently or is moving erratically. In addition, in various embodiments, information about the one or more road actors may be received wirelessly from external sources 150 at 306. Further, in various embodiments, at 306 the road actor observation module 212 can identify a new road actor to the scene, or when a previously identified road actor leaves the proximity of the vehicle.

In various embodiments, at 306, a surface observation module may observe, for the preprogrammed duration of time, the surface of the road to determine if it has changed in a way that would affect the ALC. At 306, data about a road surface may be received from the camera system 118 and sensors. For example, if the surface of the road has gotten icy, is full of potholes, or has had some surface changes due to road construction, the system 102 may determine that the surface has changed but the change is insignificant (i.e., does not exceed a threshold of tolerance for the respective road surface change), or that the surface has changed in a significant way (i.e., the surface change does exceed a threshold of tolerance for the respective road surface change) and the ALC operation should not be executed at this time.

Upon completion of the confidence building operations, at the elapse of the duration of time, the mission planner module 202 may determine whether the ALC is justified at 308. For example, at the expiration of the preprogrammed duration of time, the system 102 may process all data collected in the ALC confidence building operations with predefined conditions to determine whether the ALC operation still makes sense. In various embodiments, a dedicated trigger condition evaluation module 216 may perform these operations. The conditions utilized at 308 are understood to be the same as the conditions used in the vetting described above (that was performed prior to sending the ALC request at 302). The system 102 determines that the ALC is justified based on the results of the confidence building operations. In various embodiments, the system 102 may determine that the ALC is justified based upon a coexistence of the ALC trigger conditions: the lane is still there (geometrically) and all identified road actors are driving consistently such that an opening for the ALC is present. In various embodiment, the system 102 may determine that the ALC is justified upon a coexistence of the ALC trigger conditions: the lane is still there (geometrically), all identified road actors are driving consistently such that an opening for the ALC is present, and additionally, the road surface has not changed in a significant way to avert the ALC.

From 308, if the trigger conditions do not coexist, the system 102 determines that the ALC trigger is not justified, the system 102 may withdraw the ALC heads-up at 310. In an embodiment, at 308, the system 102 may determine that the ALC is not justified upon a determination that an intended lane is no longer available or a road actor is driving inconsistently. In an embodiment, at 308, the system 102 may determine that the ALC is not justified upon a determination that an intended lane is no longer available, a road actor is driving inconsistently, or a surface of the road has changed in a significant way.

If the ALC trigger is determined justified at 308, the system 102 may move to receiving a lateral control readiness signal at 312. A module such as the recognizing ALC readiness module 218 may perform the operations of receiving the lateral control readiness signal (shortened to "signal") from the lateral control module 204 and decoding it. In various embodiments, encoded into the signal sent from the lateral controller module is either "ALC ready" or the absence of "ALC ready." In various embodiments, encoded into the signal sent from the lateral controller module is either "ALC ready" or "wait." In various embodiments, encoded into the signal sent from the lateral controller module is either "ALC ready" or "wait X," wherein X is a wait time.

At 314, if the lateral control module 204 has not signaled that it is ready to perform an ALC (either with a wait, a wait X, or an absence of ALC ready), the system 102 may loop back to 306 and continue confidence building operations.

At 314, if the lateral control module 204 has signaled that it is ready to perform an ALC, the system 102 moves to 316, to command the ALC execution. In operation, at 316, a command generation module 220 generates commands for the lateral controls in the drive systems 106 to execute the ALC. In various embodiments, at 316, the system 102 further generates commands for alerting the driver, via the user interface 114, such as commands for lighting up icons on the dashboard, and commands for an audio system.

Figure 6:
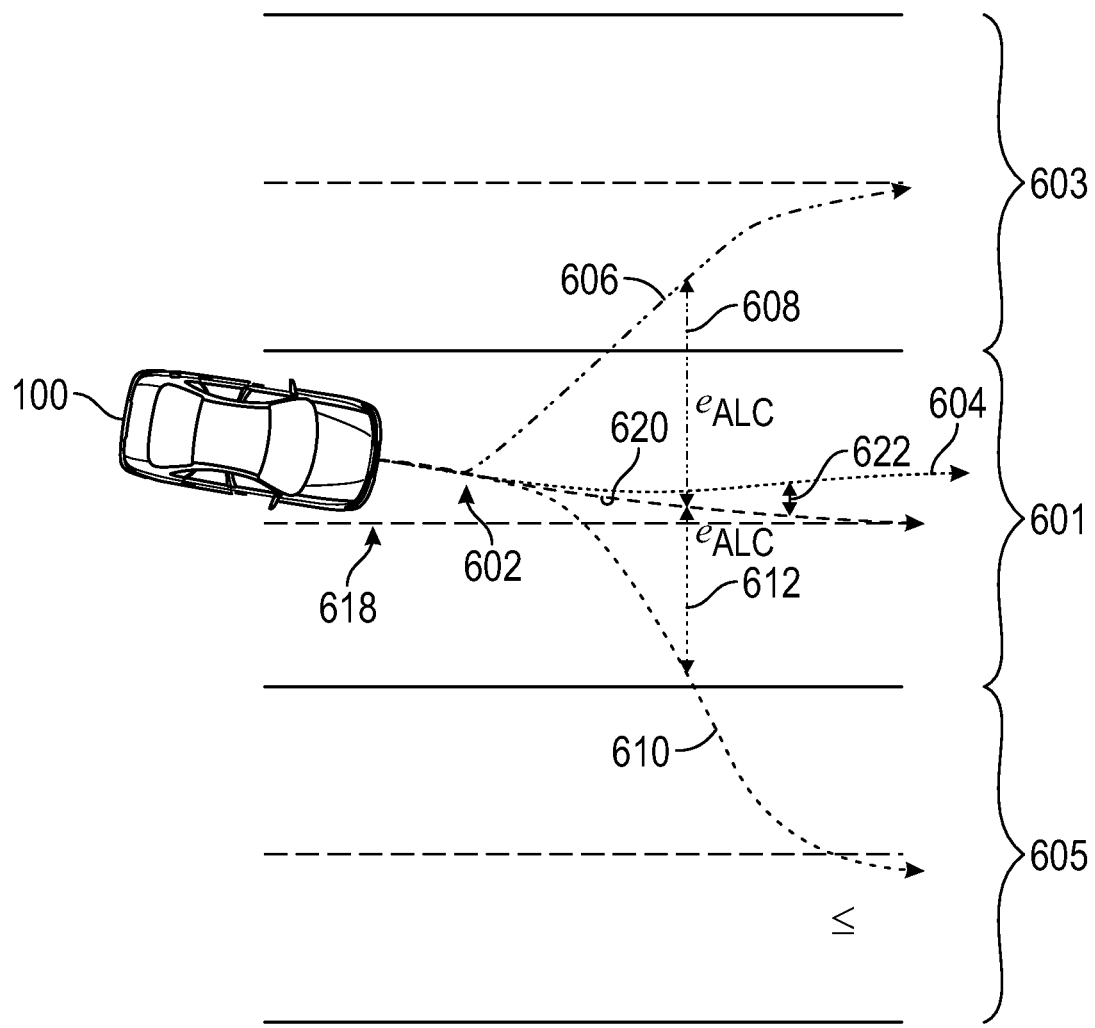

From the perspective of the lateral control module 204, at 402 the ALC heads up signal from the mission planner module 202 is received, generally by a sub module for receiving ALC heads up signal 224. At 404, responsive to the ALC heads up signal, the lateral control module 204 may calculate an index of readiness, $R_{ALC}$. The ALC heads up signal includes the specific lane change operation (e.g., left or right) that is requested. The lateral control module 204 also receives and processes, at 404, a current trajectory of the vehicle 100 and generates, based thereon, lane centering controls (LCC) status that results in a LCC path (FIG. 6, 620). In various embodiments, these inputs are received from the central platform controller 108, or the drive systems 106. $R_{ALC}$ is calculated as a function of a current trajectory of the vehicle 100, lane centering controls (LCC) status, and the requested ALC. An error, $e_{ALC}$, is calculated between the current trajectory and the ALC path (FIGS. 6, 608 and 612), and an error, $e_{LCC}$, is calculated from the current trajectory and the LCC path (FIG. 6, 622). In various embodiments, these process steps are performed by a readiness calculating module 226. In various embodiments, the $R_{ALC}$ is calculated by equation 1, below.

$$R_{ALC} = e_{LCC}^2 e_{ALC}^2 \qquad \text{Eq. 1}$$

Each error, e, is understood to expand out to equation 2, below where $e_p$ represent a position error and $e_\phi$ represents a heading error.

$$e = \begin{bmatrix} e_p \\ \dot{e}_p \\ e_\phi \\ \dot{e}_\phi \end{bmatrix} \qquad \text{Eq. 2}$$

At 406, the $R_{ALC}$ is compared to a predefined readiness threshold (Rt). The predefined readiness threshold is a number generally between zero and 20. At 406, the system 102 determines, by comparing $R_{ALC}$ to Rt, whether to send an ALC ready signal. This comparison may be performed by a module 228, and when $R_{ALC}$ is less than or equal to Rt, the lateral control module sends an ALC ready signal to the mission planner module 202.

If $R_{ALC}$ is greater than Rt, from 406, this indicates that the system 102 has determined that it must stabilize the vehicle before launching the ALC (also referred to herein as performing the ALC), and the system 102 moves to performing stabilization at 412. In various embodiments, after 406, and before 412, an optional method step 410 of sending a "wait" or "wait X" signal is performed.

At 412, a stabilization module 230 may perform stabilization operations. The system 102 calculates a steering correction, $\delta_{AP}$, (FIG. 5, 508) required to reduce $R_{ALC}$, which means it is a steering correction required to damp out the lateral controller prior to launching the ALC. The steering correction $\delta_{AP}$ is determined by equation 3. In practice, the steering correction, $\delta_A$, may be resolved into a series of steering angle changes (module 232) and then the steering angle changes (module 234) may be applied at respective intervals of time to reduce the errors, e, and therefore reduce $R_{ALC}$.

$$\delta_{AP}(\Delta e, c_{ALC}) = (1 - \alpha(t, c_{ALC})) K_{AP}(\Delta e) \qquad \text{Eq. 3}$$

Achieving the $\delta_{AP}$ will take a countdown amount of time, $c_{ALC}$, during which time the vehicle 100 will travel a distance (FIG. 5, 510) that may be a function of the vehicle's dwell time, current trajectory and speed.

By design, the $\delta_{AP}$ will change the error, $\Delta e$, from its current value to a target value that is at or below the ALC readiness $R_{ALC}$. Without this system 102, lateral control performed in the drive systems 106 includes applying a steering feedforward (FF) command and a steering feedback (FB) command. With this system 102, lateral control includes applying a steering feedforward (FF) command, a steering feedback (FB) command, and the steering correction, $\delta_{AP}$, required to damp out the lateral controller for a stable ALC launch, shown in equation 4.

$$\delta = \delta_{FB} + \delta_{FF} + \delta_{AP}(\Delta e, c_{ALC}) \qquad \text{Eq. 4}$$

From equation 3, with $K_{AP}$ being a multiplier for ALC-preparedness, $K_{AP} = f(c_{ALC})$, a linear from of omega, $\Omega$, can be derived, as shown with equation 5, below, where $\Omega$ is a function of trajectory tracking heading error ($e_\psi$).

$$\Omega(e_\psi, \dot{e}_\psi, \ddot{e}_\psi) = -(1 - \alpha(t, c_{ALC}))(\Delta e) \qquad \text{Eq. 5}$$

Alpha, used in equation 3 and 5, is defined in equation 6, below.

$$\alpha(t) = \begin{cases} 1 & t \geq c_{ALC} \\ 1 - \dfrac{t}{c_{ALC}} & t < c_{ALC} \end{cases} \qquad \text{Eq. 6}$$

Upon completion of stabilization, the method 300 may cycle again to 404 to regenerate a readiness index, and to 406 to check the readiness index against the readiness threshold to determine whether to send the ALC ready signal at 408.

Figure 5:
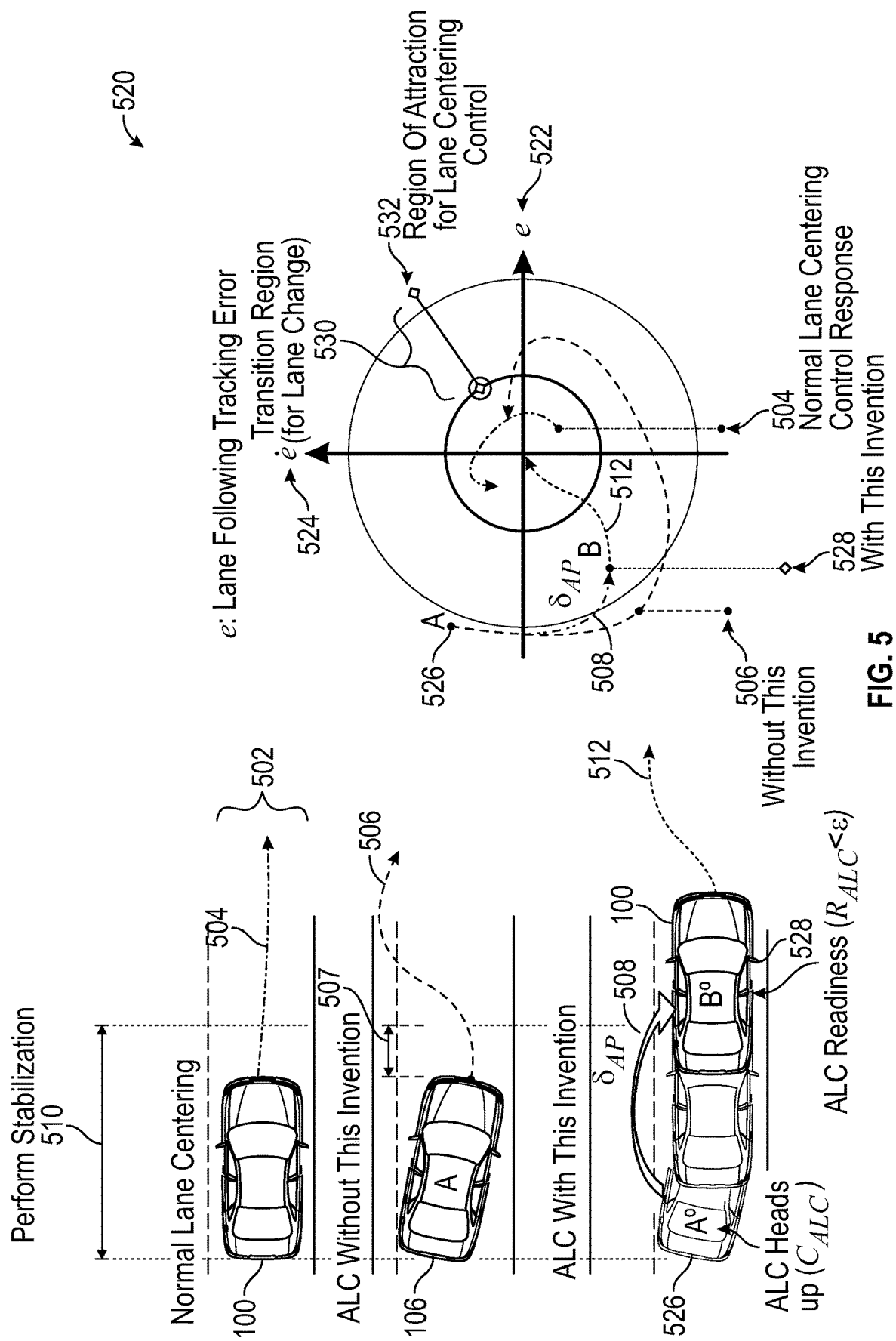
FIGS. 5-6 are provided to assist in the understanding of terms used herein.

From 408, responsive to receiving an ALC execution command, and beginning from a position of ALC readiness (FIG. 5, 528), the lateral control module 204 may cause the ALC to occur (FIG. 5, 512).

FIGS. 5-6 are provided to assist in the understanding of terms used herein. While FIGS. 5-6 are not to scale, the relative relationships are meant to be relied upon. In FIG. 5, vehicle 100 is shown in lane 502, with a lane centering controls (LCC) status directing the vehicle 100 along path 504. Without the provided system 102, when the vehicle 100 responds to an ALC request and changes lanes, the resulting path is indicated by path 506; for a portion 507 of the path 506, the vehicle may be traveling the opposite direction of the ALC. With system 102 in place, the vehicle 100 receives the ALC request at position 526, and stabilization is performed as the vehicle travels the distance 510 (during $c_{ALC}$) to achieve the ALC ready state described above. From the ALC ready position 528, the vehicle performs the ALC along path 512.

On the right side of FIG. 5, the paths from the left side are mapped onto a graph to show the change in error rate 524 ($\dot{e}$) on the Y axis and the error 522 (e) is graphed on the X axis. As can be seen, by applying the steering correction, $\delta_{AP}$ 508 the lateral controller module damps out the vehicle 100 response while the vehicle moves to position 528 for a stable ALC launch along path 512. Path 512 moves the vehicle 100 through the transition region 530 in a shorter amount of time and distance than the path 506 that is provided by available systems. A region of attraction for lane centering controls 532 is depicted. In practice, the steering correction, $\delta_{AP}$ 508 may be applied in a series of incremental adjustments, made at respective increments of time. In summary, FIG. 5 illustrates the technologic enhancement to the ALC operation provided by system 102, which is a minimization of lateral control error, and that translates into an objectively improved riding experience for a passenger.

FIG. 6 provides additional detail to FIG. 5. In FIG. 6, vehicle 100 is traveling in lane 601 with a lane centerline 618. The vehicle 100 has a vehicle path trajectory 604. Normal lane centering controls status continually strive to restore the vehicle path trajectory 604 to the centerline 618, resulting in an LCC path 620. LCC path 620 deviates from the vehicle path trajectory 604 by error $e_{LCC}$, discussed above. The $R_{ALC}$ to perform an ALC to lane 603, along path 606 is illustrated by deviation 608. While FIG. 6 is not to scale, the relative relationships are meant to be relied upon, and it can be seen that performing an ALC to lane 603 involves a change of trajectory at point 602; in this scenario, the system 102 calculates $R_{ALC}$, determines that it is greater than Rt, and therefore determines that the ALC is not ready (sending either a "wait," a "wait X," or just not sending an "ALC ready"). One can also see from FIG. 6, that for the vehicle 100, performing an ALC to lane 605 from lane 601 does not involve a change of trajectory at point 602; in this scenario, the system 102 may 102 calculate $R_{ALC}$, determine that it is less than or equal to Rt, and therefore determine that the ALC is ready.

Thus, the provided system 102 and method 300 provide a technological solution to the technical problems of available lane change systems and methods. Provided embodiments smooth ALC operations by minimizing lateral control errors, which translates into consistent driver alerting (elimination of the flashing) and an objectively improved riding experience for a passenger.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A system for automated lane change (ALC) operations implemented onboard a vehicle, the system comprising:
   a mission planner module comprising a processor and configured to:
   receive an ALC request;
   send an ALC heads up signal comprising the requested ALC responsive to the ALC request;
   perform confidence building operations, for a preprogrammed duration of time, responsive to the ALC request; and
   upon completion of the confidence building operations, determine whether the ALC is justified based on the results of the confidence building operations; and
   a lateral control module operationally coupled to the mission planner module and configured to:
   receive the ALC heads up signal comprising the requested ALC;
   calculate an index of readiness, $R_{ALC}$, responsive to the ALC heads up signal, the $R_{ALC}$ being a function of the ALC request, a current trajectory, and lane centering controls status;
   compare $R_{ALC}$ to a predefined readiness threshold, Rt; and
   when $R_{ALC}$ is less than or equal to Rt, send an ALC ready signal; and
   when $R_{ALC}$ is greater than Rt, perform stabilization operations;
   the mission planner module further configured to receive the ALC ready signal, and
   generate commands to execute the ALC when the ALC is justified, responsive to receiving the ALC ready signal;
   wherein the mission planner module is further configured to:
   receive data about nearby road actors from a camera system and sensors;
   receive data about a road geometry and road surface conditions from the camera system and sensors;
   receive mapping data from a mapping system;
   receive navigation system data for the vehicle; and
   determine that the ALC is justified upon a determination that an intended lane is still available, all identified road actors are driving consistently, and the road geometry and road surface conditions have not changed in a manner that exceeds predetermined threshold values.

2. The system of claim 1, wherein the mission planner module is further configured to: when the ALC is justified, responsive to receiving the ALC ready signal, generate commands to alert a driver of the ALC.

3. The system of claim 1, wherein the mission planner module is further configured to:
   determine that the ALC is justified upon a determination that an intended lane is still available and all identified road actors are driving consistently.

4. The system of claim 3, wherein the mission planner module is further configured to:
   determine that the ALC is not justified upon a determination that an intended lane is no longer available, or a road actor is driving inconsistently; and
   withdraw the ALC heads up signal.

5. The system of claim 1, wherein the mission planner module is further configured to:
   determine that the ALC is not justified upon a determination that an intended lane is no longer available, a road actor is driving inconsistently, or the road geometry or road surface conditions have changed in a manner that exceeds predetermined threshold values; and
   withdraw the ALC heads up signal.

6. The system of claim 1, wherein the lateral control module is further configured to:
   calculate a steering correction, $\delta_{AP}$, required to reduce $R_{ALC}$ prior to launching the ALC, the steering correction being a function of a current trajectory and a speed of the vehicle; and
   wherein performing stabilization operations includes calculating a steering correction.

7. The system of claim 6, wherein performing stabilization operations further includes applying a steering correction, $\delta_{AP}$ to stabilize the vehicle before an ALC launch.

8. The system of claim 7, wherein applying the steering correction, $\delta_{AP}$ includes applying a series of incremental adjustments, made at respective increments of time.

9. A method for automated lane change (ALC) operations implemented onboard a vehicle, the method comprising:
   at a mission planner module comprising a processor programmed with programming instructions, performing the operations of:
   receiving an ALC request;
   sending an ALC heads up signal comprising the requested ALC responsive to the ALC request;

performing confidence building operations, for a preprogrammed duration of time, responsive to the ALC request; and
determining whether the ALC is justified based on the results of the confidence building operations;
at a lateral control module operationally coupled to the mission planner module, performing the operations of:
receiving the ALC heads up signal comprising the requested ALC;
calculating an index of readiness, $R_{ALC}$, responsive to the ALC heads up signal, the $R_{ALC}$ being a function of the ALC request, a current trajectory, and lane centering controls;
comparing $R_{ALC}$ to a predefined readiness threshold, Rt; and
when $R_{ALC}$ is less than or equal to Rt, sending an ALC ready signal; and
when $R_{ALC}$ is greater than Rt, performing stabilization operations;
further comprising, at the mission planner module, receiving the ALC ready signal, and generating commands to execute the ALC when the ALC is justified, responsive to receiving the ALC ready signal; and
wherein the method further comprises, at the mission planner module:
receiving data about nearby road actors from a camera system and sensors;
receiving data about a road geometry and road surface conditions from the camera system and sensors;
receiving mapping data from a mapping system;
receiving navigation system data for the vehicle; and
determining that the ALC is justified upon a determination that an intended lane is still available, all identified road actors are driving consistently, and the road geometry and road surface conditions have not changed in a manner that exceeds predetermined threshold values.

10. The method of claim 9, further comprising, at the mission planner module: generating commands to alert a driver of the ALC when the ALC is justified, responsive to receiving the ALC ready signal.

11. The method of claim 10, further comprising, at the mission planner module:
determining that the ALC is justified upon a determination that an intended lane is still available and all identified road actors are driving consistently.

12. The method of claim 10, further comprising, at the mission planner module:
determining that the ALC is justified upon a determination that an intended lane is still there, all identified road actors are driving consistently, and the road geometry and road surface conditions have not changed in a manner that exceeds predetermined threshold values.

13. The method of claim 11, further comprising, at the mission planner module:
determining that the ALC is not justified upon a determination that an intended lane is no longer available, or a road actor is driving inconsistently; and
withdrawing the ALC heads up signal.

14. The method of claim 12, further comprising, at the mission planner module:
determining that the ALC is not justified upon a determination that an intended lane is no longer available, a road actor is driving inconsistently, or the geometry and road surface conditions have not changed in a manner that exceeds predetermined threshold values; and
withdrawing the ALC heads up signal.

15. The method of claim 9, further comprising, at the lateral control module:
calculating a steering correction, $\delta_{AP}$, required to reduce $R_{ALC}$ prior to launching the ALC, the steering correction being a function of a current trajectory and a speed of the vehicle; and
wherein performing stabilization operations includes calculating a steering correction.

16. The method of claim 15, wherein performing stabilization operations further includes applying a steering correction, $\delta_{AP}$ to stabilize the vehicle before an ALC launch.

17. The method of claim 16, wherein applying the steering correction, $\delta_{AP}$ includes applying a series of incremental adjustments, made at respective increments of time.

18. A system for automated lane change (ALC) operations implemented onboard a vehicle, the system comprising:
a central platform controller configured to:
receive input from a user interface;
receive data about nearby road actors and as to a road geometry and road surface conditions from a camera system and sensors;
receive mapping data from a mapping system;
receive navigation system data for the vehicle;
vet an initial ALC request to thereby generate an ALC request based on the initial ALC request;
send an ALC heads up signal comprising the requested ALC responsive to the ALC request;
perform confidence building operations, for a preprogrammed duration of time, responsive to the ALC request; and
upon completion of the confidence building operations,
determine that the ALC is justified upon a determination that an intended lane is still available, all identified road actors are driving consistently, and the road geometry and road surface conditions have not changed in a manner that exceeds predetermined threshold values;
a drive system operationally coupled to the central platform controller and configured to:
receive the ALC heads up signal comprising the requested ALC;
calculate an index of readiness, $R_{ALC}$, responsive to the ALC heads up signal, the $R_{ALC}$ being a function of the requested ALC, a current trajectory, and lane centering controls;
compare $R_{ALC}$ to a predefined readiness threshold, Rt; and
when $R_{ALC}$ is less than or equal to Rt, send an ALC ready signal; and
when $R_{ALC}$ is greater than Rt, perform stabilization operations;
the central platform controller further configured to receive the ALC ready signal, and
generate commands to execute the ALC and generate commands to alert a driver of the ALC, when the ALC is justified, responsive to receiving the ALC ready signal.

19. The system of claim 18, wherein the drive system is further configured to
calculate a steering correction, $\delta_{AP}$, required to reduce $R_{ALC}$ prior to launching the ALC, the steering correction being a function of a current trajectory and a speed of the vehicle;
and perform stabilization operations that include calculating a steering correction.

20. The method of claim 1, wherein the road surface conditions include whether the road surface conditions include whether the road is icy, whether the road has potholes, and whether the road surface has changed due to construction.

\* \* \* \* \*